Aug. 31, 1943.                M. BARTEK                 2,328,121
                             TOOTH MOUNTING
                         Filed April 26, 1940           2 Sheets-Sheet 1
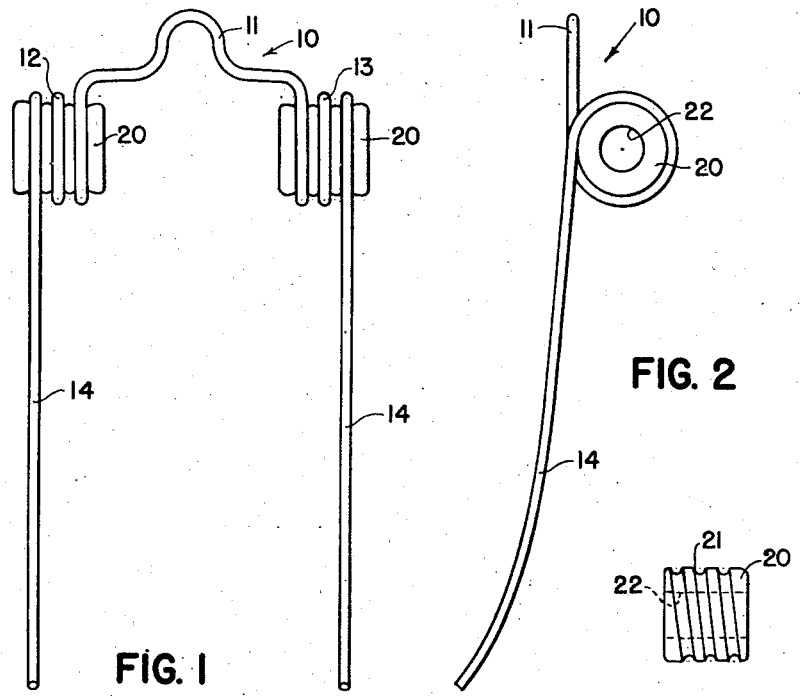
FIG. 1
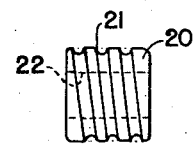
FIG. 2
FIG. 3
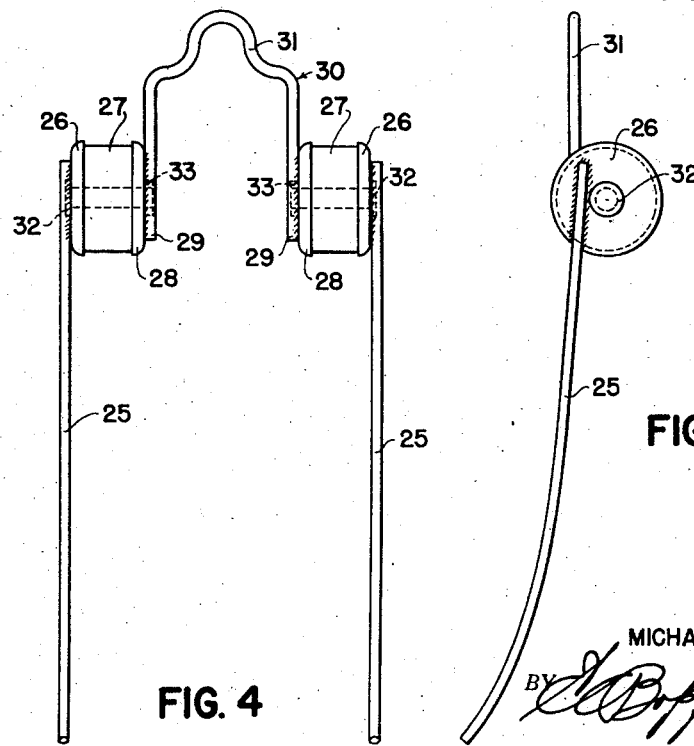
FIG. 4
FIG. 5
*INVENTOR:*
MICHAEL BARTEK
BY
*ATTORNEYS.*

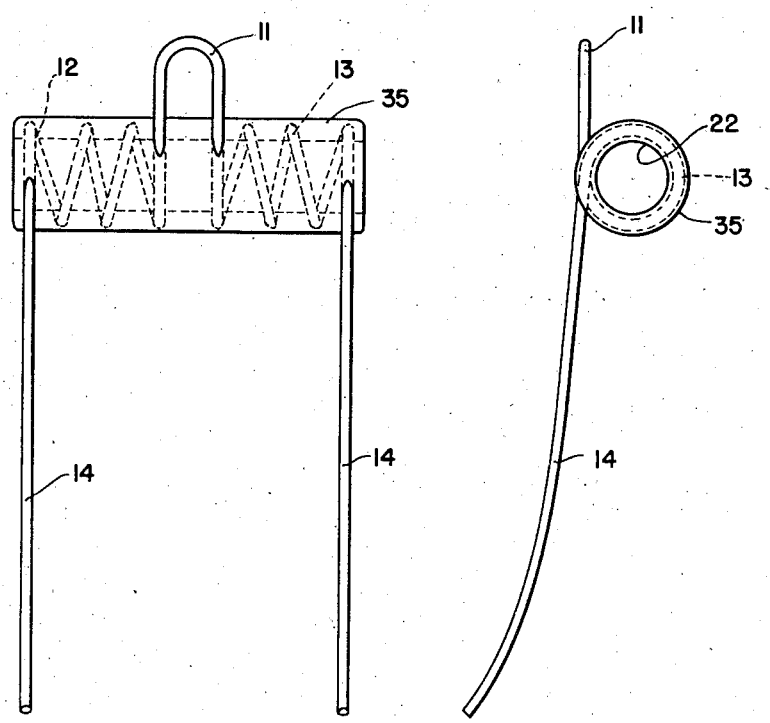

Patented Aug. 31, 1943

2,328,121

UNITED STATES PATENT OFFICE 2,328,121

TOOTH MOUNTING

Michael Bartek, Moline, Ill., assignor to Deere & Company, Moline, Ill., a corporation of Illinois Application April 26, 1940, Serial No. 331,783

11 Claims. (Cl. 56—400)

The present invention relates generally to agricultural implements and more particularly to resiliently mounted ground engaging tools, with especial reference to teeth or tines of the class used on side delivery rakes, pick-up devices, etc., and has for its principal object the provision of a resilient tooth mounting which is more durable and which tends to reduce the maintenance cost of the implement.

While the conventional spring tooth can be deflected through a wide angle without danger of breakage, it is possible to cause failure in a comparatively short time by repeatedly deflecting and releasing the tooth suddenly, causing it to vibrate. This failure is caused by fatigue of the metal under rapid reversal of stress. The factors which are involved in fatigue failures are of the number of reversals to which the material is submitted and the unit stress imposed upon the material at each reversal. Thus a decrease in either factor results in an increase in the life of the tool.

A conventional spring tooth for a rake or pick-up device or the like comprises a metal wire having a coiled spring supporting portion and a straight top supporting portion extending therefrom. The diameter of the wire and of the coil are determined by practical conditions to obtain an effective tooth having sufficient stiffness to accomplish the desired purpose. The life of the tooth could be extended by increasing the diameter of the coil, for in that case the unit stress set up in the material by a given deflection would be decreased. However, this expedient would have the practical disadvantages of less clearance above the ground and also less stiffness, resulting in poorer operating efficiency.

The life of the tooth can, however, be extended without affecting the operating characteristics by reducing the number of reversals to which the tooth is submitted, which is a specific object of the present invention. The deflections of the teeth are caused by engagements with rocks and other obstructions, which would not alone cause failure of the teeth but upon release from each obstruction the tooth vibrates and after a sufficient number of vibrations have occurred, fatigue failure occurs. In the accomplishment of this object I have provided means for damping the oscillations in the form of a rubber plug which fits into the coil of the spring and absorbs the energy therefrom as the tooth vibrates. The ideal result would be theoretically obtained if the rubber had no elasticity whatever, but had only plasticity, for then the tooth would be aperiodically damped and would not swing past its normal position. This condition can at least be approached by selecting a rubber of low elasticity.

The amount of elasticity in the rubber can be allowed for in making the spring coil, by providing a spring of less stiffness, resulting in a damped spring tooth equal in stiffness to a conventional undamped tooth. The damping effect of the rubber is due to its relatively high hysteresis loss, which absorbs the potential energy set up by the strain in the tooth. A further object of my invention relates to the provision of a tooth in which the coil spring is entirely replaced by a rubber support.

These and other objects and advantages of my invention will be apparent to those skilled in the art after a consideration of the following description in which reference is had to the drawings appended hereto, in which Figure 1 is a front elevational view of a spring tooth embodying the principles of the present invention;

Figure 2 is a side elevational view of the tooth shown in Figure 1;

Figure 3 is a view of the rubber plug or damper;

Figure 4 is a front elevation showing a second embodiment of my invention;

Figure 5 is a side elevation of the embodiment shown in Figure 4;

Figure 6 is a front elevation of a spring tooth illustrating a third embodiment of my invention; and Figure 7 is a side elevation of the embodiment shown in Figure 6.

Referring now to the drawings and more particularly to Figures 1 to 3, inclusive, the spring tooth, indicated in its entirety by reference numeral 10, comprises a wire having a U-shaped bend 11 at the intermediate portion of the wire and serving as a means for attachment to a supporting member, as is well known to those skilled in the art. The wire is bent laterally in opposite directions from the loop 11 and each end of the wire is coiled into a helical coil 12, 13 to form a spring, the coils 12, 13 being disposed generally coaxially at opposite sides of the loop 11, and the ends of the wire extend tangentially from the coils 12, 13 generally in the plane of the loop 11 to form a pair of laterally spaced crop engaging tines 14.

The tooth thus far described is conventional, but according to the principles of the present invention a pair of rubber dampers 20 are provided in the form of generally cylindrical rubber plugs which fit tightly within the coils 12, 13 and are disposed coaxially therewith. Each plug 20 is provided with a helical ridge 21 or thread which is adapted to thread tightly between the helical turns of wire in the coil, the object being to embed the coil in the rubber to obtain as firm a connection between the rubber and the coil as possible in order to prevent sliding movement between the wire and the rubber as the coil is flexed. Preferably, the rubber damper 20 is bonded to the wire in the coil by vulcanization, a process which is known to those skilled in the art. By eliminating sliding movement between the damper and the coil, friction and consequently wear are eliminated, and the rubber flexes with the turns of the coil and acts as a damper to resist vibration of the coils and tines. The damper 20 is provided with a central aperture 22 to accommodate deformation of the rubber plug 20.

In operation, the vibration of the tines 14 tends to tighten and loosen the coils 12, 13, and thus tending to compress and expand the plugs 20 in the coils. As previously stated, the energy which causes the vibrations is absorbed by the rubber of the damper and converted to heat by virtue of the hysteresis loss in the rubber. In this embodiment it is desirable to have rubber of a low elasticity as the damping effect of the rubber would be greatest if the rubber was merely plastic.

The embodiment shown in Figures 4 and 5, however, takes advantage of a certain amount of elasticity in the rubber and thus entirely eliminates the coils of the wire. In this embodiment the tines 25 comprise substantially straight pieces of wire which are welded or otherwise fixed at their upper ends to cup-shaped metal socket members 26, each of which tightly receives the ends of a rubber damper 27 which is secured within the socket 26 by vulcanizing or by any other suitable process for obtaining a bond between the rubber and the socket. Each of the dampers 27 is cylindrical in shape and is supported at its inner end on a second cup-shaped socket member 28 and suitably fixed thereto, as by vulcanizing. The socket members 28 are supported on two legs 29 of a bifurcated support 30 which comprises a wire having an intermediate loop 31 which is adapted to be fastened to the implement frame, as by means of a bolt.

As the tines 25 are flexed, the elastic rubber cylinders 27 are stressed in torsion but vibrations of the tines are damped by the hysteresis effect in the rubber. A retaining bolt 32 is provided to loosely connect the two cup-shaped socket members 26 and 28 and extends axially through a central aperture in the members and in the rubber 27. Nuts 33 are provided at the inner ends of the bolts 32 but they are not tightened against the socket members because the latter should be free to move angularly with the tines 25. The purpose of the bolts 32 is to retain the tines 25 in case of breakage of any of the rubber cylinders 27, although this is not essential.

Referring now to Figures 6 and 7, in this embodiment as in the embodiment of Figures 1–3, the helical coils 12, 13 are embedded in rubber, but in Figures 6 and 7, a single rubber damper 35 is provided, which encloses both coils 12, 13. This damper is preferably formed by pouring molten rubber into a mold about the coils and allowed to solidify. The turns of each coil are separated to permit the rubber to flow therebetween and completely envelope each turn.

I do not intend my invention to be limited to the exact details shown and described herein except as set forth in the following claims.

I claim:

1. A spring tooth of the class described comprising a metallic crop engaging tine, a supporting shank therefor, and a rubber damper attached solely to the tooth between said shank and said tine for damping oscillatory movement between said tine and said shank.

2. A spring tooth of the class described comprising a crop engaging tine, a supporting shank connected thereto, a resilient block connected between said tine and said shank and so arranged as to be stressed in torsion when said tine is deflected relative to said shank.

3. A spring tooth of the class described comprising a helically coiled wire having one end extended to provide a crop engaging tine and adapted to be stressed in torsion when the tine engages an obstruction during operation, and a resilient block in which said coil is embedded, said block serving as a damper to restrain said tine and coil from vibration.

4. A spring tooth of the class described comprising a helically coiled wire having one end extended to provide a crop engaging tine and adapted to be stressed in torsion when the tine engages an obstruction during operation, and a rubber plug adapted to fit tightly within said coil to serve as a damper against vibration of the latter.

5. A spring tooth of the class described comprising a helically coiled wire having one end extended to provide a crop engaging tine and adapted to be stressed in torsion when the tine engages an obstruction during operation, the other end of said wire being adapted for attachment to a supporting member, and a rubber block in which said coil is embedded whereby the rubber clings to the turns of the wire coil and is distorted thereby when the coil is flexed and serves to damp the vibrations of the coil when the latter is suddenly released from a position under strain.

6. A spring tooth of the class described comprising a rubber block, a tine and a supporting shank attached thereto in spaced relation to each other, said block serving to damp vibrations of said tine relative to said shank.

7. A spring tooth of the class described comprising a bifurcated supporting member, a pair of laterally spaced coaxially disposed cylindrical rubber members one end of each member being attached to one of the legs of said bifurcated member, and a pair of tines attached to the other ends of said rubber members, respectively.

8. A spring tooth of the class described comprising a pair of opposed cup-shaped socket members, a cylindrical rubber member fixed at opposite ends within said socket members, respectively, a tine fixed to one of said socket members, and a support fixed to the other of said socket members.

9. A spring tooth of the class described comprising a bifurcated support, a pair of cup-shaped socket members fixed to the legs of said support, respectively, and disposed in axial alignment, a pair of coaxially disposed cylindrical rubber members, each having one end supported fixedly in one of said socket members, a second pair of cup-shaped socket members embracing the opposite ends of said rubber members, respectively, and a pair of tines fixed to said second pair of socket members, respectively.

10. A spring tooth of the class described, comprising a pair of coaxially disposed helical wire coils, the inner ends of said coils being interconnected to provide a support therefor and the outer ends thereof being extended in substantially parallel arrangement to provide a pair of crop engaging tines, and a pair of rubber blocks in which said coils are embedded, respectively, said blocks serving as dampers to damp vibrations of said tines and coils.

11. A spring tooth of the class described comprising a crop engaging tine, a supporting shank therefor, a yieldable metallic connection between said tine and said shank, permitting deflection of said tine relative to said shank, and a rubber connection carried solely on said tooth between said tine and shank, and so arranged and constructed as to be stressed in torsion during said deflection and serving as a damper during relative oscillatory movement.

MICHAEL BARTEK.